(12) United States Patent
Heller et al.

(10) Patent No.: US 12,049,368 B2
(45) Date of Patent: Jul. 30, 2024

(54) MODULAR SWITCH DEVICE FOR TEMPORARILY STORING WORKPIECE CARRIERS FOR A LINEAR CONVEYOR SYSTEM

(71) Applicant: MD ELEKTRONIK GmbH, Waldkraiburg (DE)

(72) Inventors: Maria Heller, Isen (DE); Udo Schuster, Traunwalchen (DE); Maximilian Preusche, Vilsbiburg (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 140 days.

(21) Appl. No.: 17/874,301

(22) Filed: Jul. 27, 2022

(65) Prior Publication Data

US 2023/0044843 A1 Feb. 9, 2023

(30) Foreign Application Priority Data

Aug. 4, 2021 (DE) ...................... 10 2021 120 291.4

(51) Int. Cl.
*B65G 47/69* (2006.01)
(52) U.S. Cl.
CPC .......... *B65G 47/69* (2013.01); *B65G 2207/30* (2013.01)
(58) Field of Classification Search
None
See application file for complete search history.

(56) References Cited

U.S. PATENT DOCUMENTS

| 6,095,054 | A | 8/2000 | Kawano et al. | |
| 7,699,158 | B2* | 4/2010 | Aust | B65G 47/643 |
| | | | | 198/369.1 |
| 8,892,278 | B2* | 11/2014 | Lin | B65G 47/52 |
| | | | | 414/592 |
| 9,611,107 | B2* | 4/2017 | Wernersbach | B65G 47/648 |

FOREIGN PATENT DOCUMENTS

| DE | 10009903 A1 | 9/2001 |
| JP | H05178413 A | 7/1993 |
| WO | WO 2009035388 A1 | 3/2009 |

* cited by examiner

*Primary Examiner* — William R Harp
(74) *Attorney, Agent, or Firm* — LEYDIG, VOIT & MAYER, LTD.

(57) ABSTRACT

A modular switch device temporarily stores workpiece carriers for a linear conveyor system. The modular switch device is arrangeable between a changeover region, comprising a depositing and/or removal region, and a processing region of the linear conveyor system that conveys workpiece carriers at a conveyance level. The modular switch device includes a first and second horizontally arranged carrier unit. The carrier units are disposed vertically one above the other at a fixed distance. Each carrier unit has a respective guide apparatus, by which respective ones of the workpiece carriers are conveyable in a conveyance direction in interaction with a conveyor belt. The carrier units are movable together in a vertical direction by a lifting device in such a way that both guide apparatuses are positionable such that the respective workpiece carriers are conveyable at the conveyance level by the respective guide apparatuses.

16 Claims, 6 Drawing Sheets

MODULAR SWITCH DEVICE FOR TEMPORARILY STORING WORKPIECE CARRIERS FOR A LINEAR CONVEYOR SYSTEM

CROSS REFERENCE TO RELATED APPLICATIONS

This application claims benefit to German Patent Application No. DE 10 2021 120 291.4, filed on Aug. 4, 2021, which is hereby incorporated by reference herein.

FIELD

The invention relates to a modular switch device for temporarily storing workpiece carriers for a linear conveyor system. The invention further relates to a method for operating a switch device of this kind, to machine-readable program code, and to a control unit that is suitable for carrying out the method.

BACKGROUND

Linear conveyor systems are used in industrial manufacturing for example to convey workpieces along a particular production line. Linear conveyor systems of this kind generally comprise a conveyor belt by means of which workpiece carriers borne thereon can be conveyed in a desired conveyance direction. Within the context of this application, the vertical level at which the workpiece carriers can be or are conveyed along the conveyor belt of the linear conveyor system is referred to as the conveyance level.

During a technical process in which a linear conveyor system of this kind is used, the workpieces generally pass through a certain number of intended manufacturing steps.

In particular, a linear conveyor system of this kind may be used to manufacture electrical lines. However, it may also be used for any other workpieces.

Linear conveyor systems for manufacturing have long been known, for instance from the expired US patent specification U.S. Pat. No. 6,095,054.

Usually, linear conveyor systems of this kind comprise changeover regions for workpieces, in which workpieces that are to be or have been processed can be swapped. In these changeover regions, for example, workpieces to be processed are placed on workpiece carriers, which can be conveyed on the conveyor belt, or workpieces that have been fully processed are removed from the workpiece carriers that can be conveyed on the conveyor belt.

If a changeover region is used for depositing workpieces on the linear conveyor system or feeding them thereto, it can be referred to as a depositing region. If a changeover region is used for removing workpieces from the linear conveyor system, it can be referred to as a removal region.

Once the workpieces have been deposited, they are conveyed by means of the linear conveyor system from the changeover region into a processing region in which the workpieces are processed. Once completely processed, they are conveyed onward to the removal region. In linear conveyor systems of this kind, the depositing region and removal region are spatially separate. Usually, the workpieces are conveyed in a particular direction of circulation.

Therefore, before workpiece carriers can be reloaded with workpieces, the processed workpieces have to be removed from the linear conveyor system in the removal region and the workpiece carriers have to be conveyed back to the depositing region.

By contrast with linear conveyor systems, which can also be referred to as linear transfer installations or linear transfer systems, in so-called "rotary table installations" the depositing region and removal region are identical, i.e., workpieces are deposited and removed at the same location. This has processing advantages. However, rotary table installations of this kind are not suitable for processing every kind of workpiece, in particular not for bulky workpieces.

In linear conveyor installations, the workpieces are often deposited and removed by operators. They may be deposited by one operator and removed by another operator, or they are deposited by just one operator and removed by an automated system.

In rotary table systems, the workpieces may be deposited and removed by one operator.

To provide the highest possible production processing rates in terms of depositing and removing workpieces, it is essential for workpieces to be deposited quickly and also removed quickly.

To speed up the swapping process for workpieces on the linear conveyor system, it is known that machines may be used to assist with the removal. This increases the removal rate. Potentially, there may even be no need for a second operator for the changeover region.

SUMMARY

In an embodiment, the present invention provides a modular switch device that temporarily stores workpiece carriers for a linear conveyor system. The modular switch device is arrangeable between a changeover region, comprising a depositing and/or removal region, and a processing region of the linear conveyor system that conveys workpiece carriers at a conveyance level. The modular switch device includes a first and a second carrier unit, wherein the first and the second carrier unit are each horizontally arranged and are disposed vertically one above the other at a fixed distance from one another. Each of the first and the second carrier unit have a respective guide apparatus, by which respective ones of the workpiece carriers are conveyable in a conveyance direction in interaction with a conveyor belt. The first and the second carrier unit are movable together in a vertical direction by a lifting device in such a way that both the guide apparatus arranged on the first carrier unit and the guide apparatus arranged on the second carrier unit are positionable such that the respective workpiece carriers are conveyable at the conveyance level by the respective guide apparatuses.

BRIEF DESCRIPTION OF THE DRAWINGS

Subject matter of the present disclosure will be described in even greater detail below based on the exemplary figures. All features described and/or illustrated herein can be used alone or combined in different combinations. The drawings are merely schematic representations and serve only to illustrate embodiments of the invention. Identical or functionally equivalent elements are given the same reference signs throughout The features and advantages of various embodiments will become apparent by reading the following detailed description with reference to the attached drawings, which illustrate the following.

DETAILED DESCRIPTION

Embodiments of the present invention further improve the process for processing workpieces on a linear conveyor system, in particular so as to avoid idle time in the processing region of the linear conveyor system while the workpieces are being swapped.

In an embodiment, the present invention provides a solution by means of which the efficiency in a linear conveyor system can be increased.

In an embodiment, the present invention provides a modular switch device for temporarily storing workpiece carriers for a linear conveyor system, wherein the switch device can be arranged between a changeover region, in particular a depositing and/or removal region, and a processing region of a linear conveyor system that conveys workpiece carriers at a conveyance level, in particular for the industrial manufacture of workpieces, in particular lines, comprising a first horizontally arranged carrier unit and a second horizontally arranged carrier unit, wherein the first and second carrier units are arranged vertically one above the other and at a fixed distance from one another, wherein a respective guide apparatus is borne on both the first carrier unit and the second carrier unit, by which guide apparatuses workpiece carriers can be conveyed in a conveyance direction in interaction with a conveyor belt, wherein the first carrier unit and the second carrier unit can be moved together in the vertical direction by means of a lifting device in such a way that both the guide apparatus arranged on the first carrier unit and the guide apparatus arranged on the second carrier unit can be positioned such that workpiece carriers can be conveyed at the conveyance level by means of the relevant guide apparatus.

By means of a switch device of this kind, it is possible to temporarily store workpiece carriers, which are loaded with workpieces, in a plane that is different from the conveyance level, and to feed them back to the linear conveyor system or processing region when needed. As a result, it is possible to create a changeover region for a linear conveyor system that can be used as both a depositing region and a removal region. The advantages of a rotary table installation are thus combined with those of a linear conveyor installation. For this reason, staff and thus costs can be reduced without adversely affecting the capacity utilization of a processing region of a linear conveyor installation.

The workpieces temporarily stored by means of the switch device can be introduced directly into the processing region as soon as the workpieces conveyed back from the processing region have passed by the switch device on the way toward the changeover region, which acts as the removal region. While the workpieces that were temporarily stored previously are being processed in the processing region, the workpieces can be removed in the changeover region acting as the removal region. Where appropriate, the workpiece carriers may even be reloaded with workpieces at this stage.

In addition, the modular nature of the switch apparatus means that it can be readily added as an add-on module for existing modular linear conveyor systems. The solution can be easily scaled for a wide range of uses by adjusting the size of the switch device, and thus the temporary-storage capacity, or by using a plurality of switch devices.

This switch device can advantageously be used for a linear conveyor system having a modular construction. In other words, the processing region and the changeover region are formed by one or more modules of the linear conveyor system. The switch device can thus be inserted or arranged between a first module of a processing region and the last module of a changeover region without difficulty.

The "conveyance direction" should be understood as the direction in which workpiece carriers can be conveyed. Workpiece carriers can be conveyed along the conveyor belt of the linear conveyor system from the changeover region to the processing region and from the processing region to the changeover region. There are thus two conveyance directions: from the processing region toward the changeover region and from the changeover region toward the processing region.

Where the description states "in the conveyance direction" or "counter to the conveyance direction", this applies to one particular conveyance direction and, in this context, is intended to illustrate relative local relationships with respect to one particular conveyance direction.

For the first and second carrier units, it is possible to use any structures that are suitable for carrying a guide apparatus borne thereon, together with workpiece carriers and workpieces. Advantageously, the first and/or the second carrier unit may comprise a base plate. This base plate may be provided with cavities to reduce the weight. This reduces the weight of each carrier unit, so less force, and thus less energy, is needed in order to move the carrier units vertically.

Where merely the term "carrier unit" is used below without the qualification "first" or "second", the statements apply to the first and the second carrier unit in isolation in each case; it does not follow that both the first and second carrier units are formed in that manner, but rather that at least one of the two carrier units or alternatively both carrier units can be formed. In an advantageous configuration, the first and second carrier units, together with the components arranged or borne thereon, are structurally identical.

The first and second carrier units are each arranged so as to extend horizontally and at a vertical distance from one another. The two carrier units are also arranged one above the other, in particular congruently in the vertical direction. The first carrier unit and the second carrier unit are arranged at a predetermined, fixed distance relative to one another. In other words, the distance between the first carrier unit and the second carrier unit always remains the same regardless of the absolute vertical position.

The first carrier unit and the second carrier unit are part of an overall rigid structural unit that can be moved in the vertical direction between two positions by means of the lifting device in such a way that, in a first position, the guide apparatus arranged on the first carrier unit can be positioned such that workpiece carriers can be conveyed at the conveyance level by means of the guide apparatus arranged on the first carrier unit, and, in a second position, the guide apparatus arranged on the second carrier unit can be positioned such that workpiece carriers can be conveyed at the same conveyance level by means of the guide apparatus arranged on the second carrier unit.

Therefore, either only the first carrier unit or only the second carrier unit may always be arranged such that workpiece carriers can be conveyed at the conveyance level by means of the respective guide apparatuses of the carrier units. Moving the carrier units together does not mean that the first and second carrier units are simultaneously arranged such that workpiece carriers can be conveyed at the conveyance level by means of the respective guide apparatus of each carrier unit. Within the meaning of the application, "can be moved together" thus means a rigidly coupled movement of the first and second carrier units by means of the lifting device. In other words, the movement of the first carrier unit tracks that of the second carrier unit, and vice versa, but the relative position of the first carrier unit in relation to the second carrier unit stays constant both during the movement and in the adjustable end positions of the carrier units.

A respective guide apparatus is arranged on the first carrier unit and on the second carrier unit, by means of which guide apparatuses workpiece carriers can be conveyed in a guided manner at the conveyance level. Preferably, the guide apparatus arranged on the first carrier unit and the guide apparatus arranged on the second carrier unit may be structurally identical.

The workpiece carriers can be driven by means of a conveyor belt, particularly when they are arranged at the conveyance level. In the process, a conveyor belt may be borne on the first and second carrier units and can be driven when the relevant carrier unit is arranged such that workpiece carriers can be conveyed at the conveyance level.

In an advantageous embodiment, however, none of the carrier units comprises a conveyor belt, and a conveyor belt is arranged on a locally stationary part of the switch device. Preferably, said conveyor belt is arranged such that a base of a workpiece carrier is positioned thereon, and thus the workpiece carrier can be conveyed, when the workpiece carrier arranged on the first or second carrier unit is arranged at the conveyance level.

In addition, the guide apparatus borne on the first and/or second carrier unit may be arranged and configured such that workpiece carriers arriving from a processing region can be continuously transferred to the guide apparatus borne on the first and/or second carrier unit. The guide apparatus borne on the first and/or second carrier unit may also be arranged and configured such that workpiece carriers arriving from a changeover region can be continuously transferred to the guide apparatus borne on the first and/or second carrier unit.

Workpiece carriers may be transferred from the processing region and the changeover region to the guide apparatus of the relevant carrier unit in particular when the carrier unit to which workpiece carriers are to be transferred is arranged such that it can convey workpiece carriers at the conveyance level.

Any lifting device can be used as the lifting device for vertically moving the first and second carrier units together. For example, said lifting device can bring about a vertical movement using servomotors, hydraulic cylinders, or other methods. However, the lifting device should be configured such that it can reliably cause the first and second carrier units to move together vertically along with workpiece carriers that are arranged at least on one of the carrier units and loaded with workpieces. In addition, the lifting apparatus is configured in such a way that it can arrange the first carrier unit in a first raised position such that workpiece carriers that can be arranged on the guide apparatus of said second carrier unit can be conveyed at the conveyance level. The lifting apparatus is also configured such that it can arrange the second carrier unit in a second raised position such that workpiece carriers that can be arranged on the guide apparatus of said carrier unit can be conveyed at the conveyance level.

Advantageously, the lifting device is controlled by means of a control unit. For this purpose, the vertical position of the first and/or second carrier unit can be detected and fed to the control unit. The control unit can then control the lifting device on that basis in such a way that the first carrier unit or the second carrier unit is arranged such that workpiece carriers arranged thereon can be conveyed at the conveyance level.

In one embodiment of the switch device, the first and second carrier units are borne on a shared wall, the wall being movable in the vertical direction by means of the lifting device. By providing a vertically movable shared wall for the first and second carrier units, a structurally simple option is provided for vertically moving the first and second carrier units together and at a fixed distance from one another. There is thus no need for separate lifting devices for the first carrier unit and the second carrier unit.

The wall can be in one part or multiple parts. In particular, it can be arranged in parallel with the conveyance direction. In addition, it can be arranged on a carrier-unit side facing away from the guide apparatus, and the normal vector thereof can be oriented in a horizontal direction perpendicularly to the conveyance direction. In this case, the wall can be referred to as the rear wall whereas the guide apparatus is arranged in a "front" region of each carrier unit.

The first carrier unit and the second carrier unit can each be connected to the wall by means of a horizontal rail arranged in parallel with the guide apparatus borne on each carrier unit. This allows the carrier units to be borne on the wall simply and securely. In addition, the wall may be non-detachably connected, for example welded, to the first and second carrier units, but the wall may be borne on the switch device so as to be vertically adjustable using a rail frame.

In a further embodiment of the switch device, the lifting device is configured as a pneumatic cylinder having a cylinder main body, which is stationary relative to a frame and is borne on the frame, and a piston that is movable in the vertical direction in a controlled manner, the piston, in particular its end, being borne on a cross-plate arranged on the wall. The frame absorbs the force of the cylinder main body that has to be applied in order to cause the first and second carrier units to move vertically. Furthermore, the frame can bear further components of the switch device. It is advantageous to use a cross-plate arranged on the wall since the force of the piston can be absorbed by the cross-plate in the vertical direction. The cross-plate thus comprises a horizontally arranged part on which the piston, or the end thereof, can be arranged. The force of the piston then acts vertically on the cross-plate arranged transversely to the wall. As a result, shear forces, in particular between the wall and the piston, are prevented. Using a pneumatic cylinder is advantageous since it can be actuated in a precise manner and displaced in the vertical direction comparatively quickly. This allows for secure vertical movement while simultaneously having short movement times for the switch device between the conveyance level and a temporary storage level for the workpiece carriers, which for example is higher than the conveyance level. In addition to the frame, a guide frame can also be provided, by which the lifting movement of the lifting device, and thus the movement of the first and second carrier units together, can be guided.

In a further embodiment, the vertical movement of the wall is limited by a first and a second shock absorber, the first shock absorber being arranged in such a way as to limit the vertical movement when the guide apparatus borne on the first carrier unit is positioned such that workpiece carriers arrangeable thereon can be conveyed at the conveyance level, the second shock absorber being arranged in such a way as to limit the vertical movement when the guide apparatus borne on the second carrier unit is positioned such that workpiece carriers arrangeable thereon can be conveyed at the conveyance level. As a result, a desired end position of the first and second carrier units, in particular based on the conveyance level, is provided in a simple manner, the movement of the first and second carrier units being braked in a controlled manner when the relevant end position is approached.

Moreover, the first and second shock absorbers can be interrogated by at least one displacement measuring device. A damping status of each shock absorber can be determined from the values of the displacement measuring device, and it can be deduced therefrom, by means of a control unit, whether the carrier unit in question is already positioned in the desired end position. The control unit can be used to actuate the lifting apparatus in such a way that the relevant carrier unit is positioned such that workpiece carriers borne thereon can be conveyed or are arranged at the conveyance level. If the first carrier unit is positioned such that workpiece carriers borne thereon can be conveyed or are arranged at the conveyance level, this preferably corresponds to the end position of the first carrier unit. If the second carrier unit is positioned such that workpiece carriers borne thereon can be conveyed or are arranged at the conveyance level, this preferably corresponds to the end position of the second carrier unit.

Preferably, the first shock absorber and the second shock absorber interact with the frame in order to limit the vertical movement. In this case, the first and/or second shock absorber may be arranged on a part that can move together with the lifting device. They can also be arranged on the frame and can interact with a part of the switch device that is movable in the vertical direction, for example with the first and/or second carrier unit, in order to limit the vertical movement.

In a further embodiment of the switch device, a plurality of sensors for detecting the position of workpiece carriers are arranged on the first and second carrier units. The sensors are preferably connected to a control unit. Since the position of individual workpiece carriers can be detected by means of corresponding sensors, the carrier units can be moved vertically depending on the position and number of the workpiece carriers present on each carrier unit. By way of example, induction sensors can be used as the sensors, by means of which it can be identified whether a workpiece carrier is present on the carrier unit at a particular position.

In a further variant of the switch device, at least one stopping device, in particular at least one stopper cylinder, is respectively arranged on the first carrier unit and/or the second carrier unit, by means of which stopping device the movement of the workpiece carriers on the relevant conveyor belt can be stopped at a predetermined position. A stopping device of this kind allows movement of the workpiece carrier to be actively interrupted. The stopping device may, for example, be in the form of a lift-off apparatus that lifts a workpiece carrier off the conveyor belt in order to stop it moving. Alternatively, the stopping device may, for example, also be in the form of a buffer that blocks the workpiece carrier from moving in the conveyance direction in that the workpiece carrier bumps into the buffer.

Preferably, the at least one stopping device is arranged in a first and/or last third, in particular a first or last quarter, of the first and/or second carrier unit in the conveyance direction. Arranging a stopping device in a first third or quarter and in a last third or quarter may be expedient since workpiece carriers can be conveyed in both directions by means of the switch device. If workpiece carriers, for example from the changeover region acting as the depositing region, run onto one of the carrier units, then the first one of the workpiece carriers in the conveyance direction can be stopped against the stopping device in the part of the first and/or second carrier unit facing the processing region. A predetermined number of workpiece carriers can bump into this first stopped workpiece carrier. If just one of the two carrier units is being used for temporarily storing workpiece carriers, only this one may have the first and second stopping devices.

The positions, and thus also the number, of the workpiece carriers may be detected using any existing position sensors. When the intended number of workpiece carriers is borne on the particular carrier unit by means of which workpiece carriers can be conveyed at the conveyance level, then a vertical movement may be brought about by means of the lifting device. This movement ends when the other carrier unit is arranged such that it can convey workpiece carriers at the conveyance level. The stopping device can thus ensure that, for example, the workpiece carriers to be temporarily stored are arranged as centrally as possible on the relevant carrier unit in a desired position.

In a further embodiment of the switch device, at least one first and one second stopping device are respectively arranged on the first carrier unit and/or the second carrier unit, by means of which stopping devices the position of workpiece carriers can be limited to a position between the first stopping device and the second stopping device on the relevant conveyor belt. It is thus possible to specify a region in which the workpiece carriers are intended to be arranged, in particular when the carrier unit is to be displaced vertically together with the workpiece carriers borne thereon. The limiting by means of the stopping device is carried out in such a way that the workpiece carriers arranged the furthest outward, i.e., the workpiece carriers arranged closest to the end of the relevant carrier unit in and counter to a particular conveyance direction, are arranged maximally at the position of the first and second stopping devices. The workpiece carriers are thus not arranged closer to the changeover region or processing region than the first and second stopping devices. The other workpiece carriers are arranged between said workpiece carriers that are arranged in the outer positions.

In a further variant of the switch device, it comprises a first fixed part, which is upstream of the first and second carrier units in the conveyance direction and is stationary relative to the conveyance level, and a second fixed part, which is downstream of the first and second carrier units in the conveyance direction and is stationary relative to the conveyance level, wherein the first and/or second fixed part comprise(s) a conveyor belt, wherein workpiece carriers arranged on the first and second carrier units can be conveyed by means of the conveyor belt when the respective workpiece carriers are arranged at the conveyance level. The first and second fixed parts are thus a part of the switch device that is not vertically movable by the lifting device and are arranged upstream and downstream of the first and second carrier units in the conveyance direction. The first and/or second fixed part can comprise a drive for the conveyor belt, which can be driven by means of the drive.

In an advantageous embodiment, the first and second fixed parts comprise a shared conveyor belt, by means of which workpiece carriers can be carried in the conveyance direction. Preferably, only the first or only the second fixed part has a drive for driving the shared conveyor belt. The shared conveyor belt is preferably arranged such as to interact with a workpiece carrier when the workpiece carrier is arranged at the conveyance level. For this purpose, the workpiece carrier can have a base that rests on the conveyor belt when the workpiece carrier is arranged at the conveyance level. As a result, the workpiece carrier can be carried in the conveyance direction unless it is stopped by a stopping device.

By arranging the drive and conveyor belt on one or both of the stationary fixed parts, it is possible to avoid having to have respective conveyor belts, possibly even with an additional drive, on the first and second carrier units. Furthermore, this avoids the need also to move the drive vertically when the first and second carrier units are moved. This would significantly increase the weight to be moved and make the switch device more expensive overall.

In addition, the first fixed part and the second fixed part can comprise a conveyance device, by means of which workpiece carriers brought from the processing region or the changeover region can be transferred to the first or second carrier unit. In particular, the first fixed part and the second fixed part can have a conveyor belt, possibly a shared conveyor belt, by means of which workpiece carriers can be conveyed at the conveyance level on the first and/or second fixed part. This conveyor belt can likewise be driven by the existing drive. It is thus possible to have a configuration whereby only one drive and only one conveyor belt are needed in order to carry workpiece carriers over the entire switch device.

In a further embodiment, the first fixed part and the second fixed part each comprise at least one stopping device configured to stop workpiece carriers, which have been brought out of the processing region and/or out of the changeover region, at a predetermined position, in particular on the fixed part that the workpiece carrier reaches first, in particular before said workpiece carriers are transferred to the guide apparatus borne on the first or second carrier unit. By using a stopping device of this kind, it can be ensured that workpiece carriers cannot be transferred when none of the carrier units is positioned such that workpiece carriers can be conveyed at the conveyance level. Otherwise, the workpiece carriers, together with the workpiece borne thereon, would fall or slip off the conveyor belt of the fixed part. Workpiece carriers brought out of the processing region can also be stopped when the first or second carrier unit is positioned such that workpiece carriers can be conveyed at the conveyance level but workpiece carriers from the changeover region currently are being fed or are intended to be fed to the accordingly positioned carrier unit. The at least one stopping device of the first and second fixed parts can be configured as a stopper cylinder.

In another embodiment, the present invention provides a method for operating a modular switch device according to any embodiment of the present invention by means of workpiece carriers, wherein a number of first workpiece carriers, said number being predetermined by a control unit, are conveyed out of a changeover region of a linear conveyor system toward the first carrier unit and arranged on the first carrier unit within a region provided for the first workpiece carriers, wherein, once the predetermined number of first workpiece carriers have been arranged on the first carrier unit, the control unit causes the first carrier unit and the second carrier unit to move vertically, thereby arranging the second carrier unit such that second workpiece carriers can be conveyed in a guided manner at the conveyance level on the guide apparatus comprised by the second carrier unit.

The first and second workpiece carriers can be structurally different or structurally identical. In particular, the workpiece carrier can be selected depending on the workpiece to be processed.

By means of this method, a predetermined number of first workpiece carriers can be temporarily stored on a first carrier unit, which can then be quickly fed to a processing region when needed. In addition, workpiece carriers traveling in the opposite conveyance direction can be channeled in a targeted manner. This allows for a shared depositing and removal region for a linear conveyor system or linear transfer system. A shuttle mode is made possible for the linear conveyor system.

Particularly when the workpieces are cables or lines, it may be advantageous to use first and second workpiece carriers that are structurally different. For example, the first workpiece carrier may have a long arm and the second workpiece carrier may have a shorter arm compared with the first workpiece carrier. This may also be the other way around, i.e., the first workpiece carrier may have a short arm and the second workpiece carrier may have a longer arm compared with the short arm. The first and second workpiece carriers may also differ structurally in another way.

Particularly when structurally different workpiece carriers are being used, workpiece carriers of different types should be prevented from being processed in the processing region at the same time, otherwise undesirable interactions may occur between workpiece carriers of different types, for example via the workpieces borne thereon.

A predetermined number of loaded first workpiece carriers, which are structurally identical to the second workpiece carriers or structurally different from the second workpiece carriers, can thus be arranged on the first carrier unit or on the guide apparatus comprised by the first carrier unit. Once the first workpiece carriers have been arranged on the first carrier unit, the first and second carrier units can be displaced vertically by means of the lifting device. The control unit controls the vertical movement in such a way that the second carrier unit is arranged such that it can convey workpiece carriers at the conveyance level. The first workpiece carriers are thus borne by means of the first carrier unit in a plane above the conveyance level and can be lowered back to the conveyance level when needed.

In a further embodiment of the method, second workpiece carriers brought from the changeover region to the switch device are conveyed in a guided manner to the processing region by means of the guide apparatus arranged on the second carrier unit, and/or second workpiece carriers transported from the processing region to the switch device are conveyed in a guided manner to the changeover region by means of the guide apparatus arranged on the second carrier unit. By means of the guide apparatus borne on the second carrier unit, therefore, workpiece carriers are conveyed in a guided manner from the processing region to the changeover region or from the changeover region to the processing region, while the first workpiece carriers remain arranged or temporarily stored on the first carrier unit. This therefore enables normal operation of the linear conveyor system that is not negatively impacted by the temporary storage of the first workpiece carriers.

In a further embodiment of the method, the control apparatus checks whether the first workpiece carriers borne on the first carrier unit have been cleared to be conveyed into the processing region or to be conveyed into the changeover region, wherein, in the event that the clearance has been given, the first carrier unit is lowered such that first workpiece carriers borne on the first carrier unit can be conveyed at the conveyance level and, once they reach the conveyance level, the first workpiece carriers are conveyed to the processing region or to the changeover region depending on the clearance given. In giving the clearance, the control unit checks whether there are second workpiece carriers still arranged in the processing region that still need to be transferred into the changeover region, provided as the removal region, before the temporarily stored first workpiece carriers are processed. In addition, the control unit may check whether there are second workpiece carriers still to be processed as a priority, i.e., to be transferred from the changeover region acting as the depositing region into the processing region, before the temporarily stored first workpiece carriers are transferred into the processing region. To do so, the control unit can be connected to a superordinate production controller, from which the control unit receives corresponding signals.

If the first workpiece carriers have been cleared, the control unit lowers the first carrier unit such that the first workpiece carriers can be conveyed at the conveyance level. If the first workpiece carriers can be conveyed at the conveyance level, they are conveyed by means of the guide apparatus and the conveyor belt from the first carrier unit into the processing region, where they are processed, or already-processed temporarily stored first workpiece carriers are conveyed into the changeover region.

Advantageously, while the first workpiece carriers are being conveyed to the processing region, or while the first workpiece carriers are being processed in the processing region, a second workpiece carrier, or at least one workpiece borne on the second workpiece carrier, is removed in the changeover region. Therefore, first workpiece carriers are processed and workpieces borne on second workpiece carriers are removed in the changeover region concurrently.

In addition, once the workpieces borne on the second workpiece carrier have been removed, or once the second workpiece carrier has been removed, at least one first or second workpiece carrier, preferably a plurality of first or second workpiece carriers, may be provided in the changeover region and fed to the switch device for temporary storage. The information on the number of workpiece carriers to be temporarily stored, and on whether they should be first or second workpiece carriers, can be specified by means of the control unit. Advantageously, these first or second workpiece carriers that are then provided can be conveyed to the switch device for temporary storage and temporarily stored on the first carrier unit before the first workpiece carriers enter from the processing region on the switch device.

In this case, for the further processing of the workpiece carriers it is advantageous to ensure that the control unit knows whether first or second workpiece carriers are temporarily stored on the switch device. Alternatively, the first carrier unit intended for temporary storage can always be used with structurally identical workpiece carriers, i.e., always with only first workpiece carriers or always with only second workpiece carriers.

It goes without saying that temporary storage can be carried out not only by means of the first carrier unit but also using the second carrier unit.

In a further embodiment, the present invention provides a control unit for controlling a switch device according to any embodiment of the present invention, the control unit comprising machine-readable program code that comprises control commands which, when executed, cause the control unit to carry out the method according to any embodiment of the present invention.

In an even further embodiment, the present invention provides a machine-readable program code for a control unit according to any embodiment of the present invention, comprising control commands which, when executed, cause the control unit to carry out the method according to any embodiment of the present invention.

Figure 1:
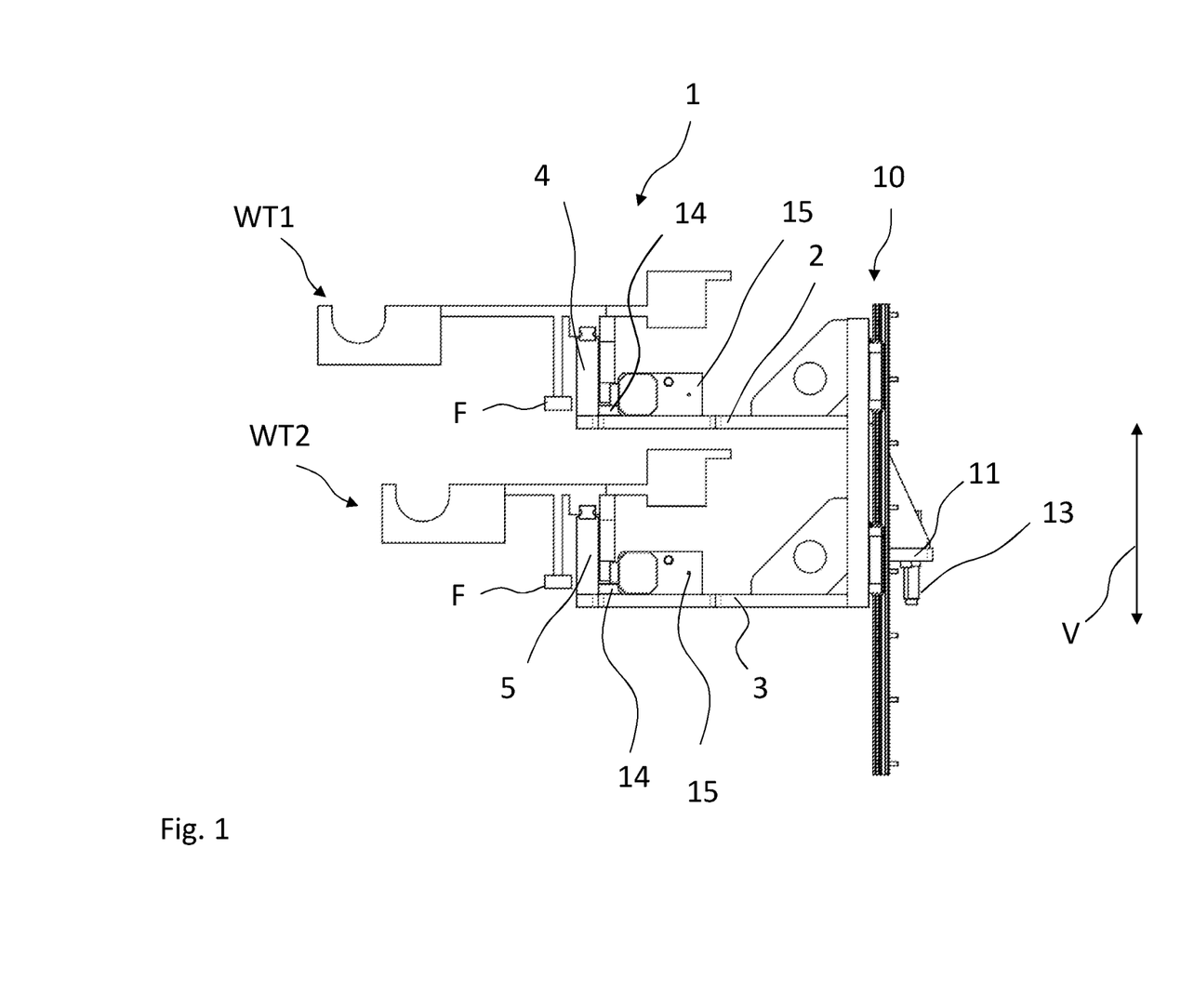
FIG. 1 is a schematic view of the cross section of a first and a second carrier unit of the modular switch device.

FIG. 1 is a schematic side view of a portion of the switch device 1. It comprises a first carrier unit 2, which is arranged horizontally, i.e., substantially perpendicularly to the direction of gravity. Additionally, the switch device 1 comprises a second carrier unit 3, which is likewise arranged horizontally. The first carrier unit 2 and the second carrier unit 3 are arranged one above the other congruently in a vertical direction V (direction of gravity) and at a fixed distance from one another. According to FIG. 1, the top carrier unit is the first carrier unit 2 and the carrier unit arranged below the first carrier unit 2 is the second carrier unit 3.

A guide apparatus 4 is arranged on the first carrier unit 2. The guide apparatus 4 has a longitudinal-extension direction extending perpendicularly into the plane of the drawing. The conveyance direction is likewise perpendicular to the plane of the drawing. If the first carrier unit 2 is arranged at a conveyance level, a base F of a first workpiece carrier WT1, arranged on or guided by the guide apparatus 4, is in contact with the conveyor belt. By means of the conveyor belt and the guide apparatus 4, the first workpiece carrier WT1 can be conveyed in a guided manner at the conveyance level.

On the second carrier unit 3 there is arranged a guide apparatus 5 by means of which workpiece carriers WT2 arranged thereon can be conveyed in a guided manner in interaction with the conveyor belt. The guide apparatus 5 too has a longitudinal-extension direction extending perpendicularly into the plane of the drawing. The conveyance direction is likewise in a direction perpendicular to the plane of the drawing. If the second carrier unit 3 is arranged at a conveyance level, a base F of a second workpiece carrier WT2, guided by means of the guide apparatus 5, is in contact with the conveyor belt. By means of the conveyor belt and the guide apparatus 5, the first workpiece carrier WT1 can be conveyed in a guided manner at the conveyance level.

The guide apparatus 4 and the guide apparatus 5 can be substantially structurally identical and can be arranged in a structurally identical manner relative to their carrier units 2 and 3, respectively.

FIG. 1 shows a first workpiece carrier WT1, which is arranged on or guided by the guide apparatus 4, and a second workpiece carrier WT2, which is arranged on or guided by the guide apparatus 5. In FIG. 1, the first workpiece carrier WT1 and the second workpiece carrier WT2 are structurally different. They may, however, also be structurally identical.

For the sake of clarity, FIG. 1 does not show the first and second workpiece carriers WT1 and WT2 in a loaded state. Typically, however, they are loaded with workpieces, for example raw cables, while the switch device 1 is in operation.

The first carrier unit 2 and the second carrier unit 3 are fixedly supported and arranged on a shared wall 10. This wall 10 may comprise one or more rails which bear the wall. Providing rails allows the first and second carrier units 2 and 3 to be mounted on the wall 10 in a simple manner or allows the wall to be mounted on the switch device 1 in a simple manner.

On the wall 10 there is arranged a cross-plate 11 on which a lifting device can be borne. By means of the lifting device, the cross-plate 11 can be moved in a vertical direction V, i.e., upward and downward, together with the wall 10. Preferably, the lifting device is borne on the cross-plate 11 such that no shear forces arise between the cross-plate 11 and the lifting device. The cross-plate comprises a shock absorber 13, which limits the vertical movement of the first and second carrier units 2 and 3 at the top and cushions it close to a bottom end position.

Moreover, the first carrier unit 2 and the second carrier unit 3 each comprise at least one sensor 14, preferably a plurality of sensors 14, for detecting whether a workpiece carrier is present at a particular position on the first or second carrier unit 2 or 3.

At least one respective stopping device in the form of a stopper cylinder 15 is arranged on both the first carrier unit 2 and the second carrier unit 3. The stopper cylinder is used for stopping a workpiece carrier WT1 or WT2 conveyed by means of the guide apparatus 4 or 5, respectively. The workpiece carrier can be stopped in different ways. For example, the workpiece carrier WT1 or WT2 can be disengaged from the conveyor belt, in particular by being lifted. By way of example, the movement of the workpiece carrier WT1 or WT2 in the conveyance direction can also be blocked by means of the stopper cylinder, for example mechanically. In this case, the base F is still engaged with the conveyor belt but the conveyor belt passes beneath the base due to the action of the stopper cylinder.

What is shown according to FIG. 1, therefore, is an assembly of the switch device 1 that is movable in the vertical direction V, in which the first carrier unit 2 and the second carrier unit 3, which are each oriented horizontally, can be raised or lowered together and, in the process, workpiece carriers WT1, WT2 can be arranged on the relevant guide apparatus 4 or 5, respectively.

Figure 2:
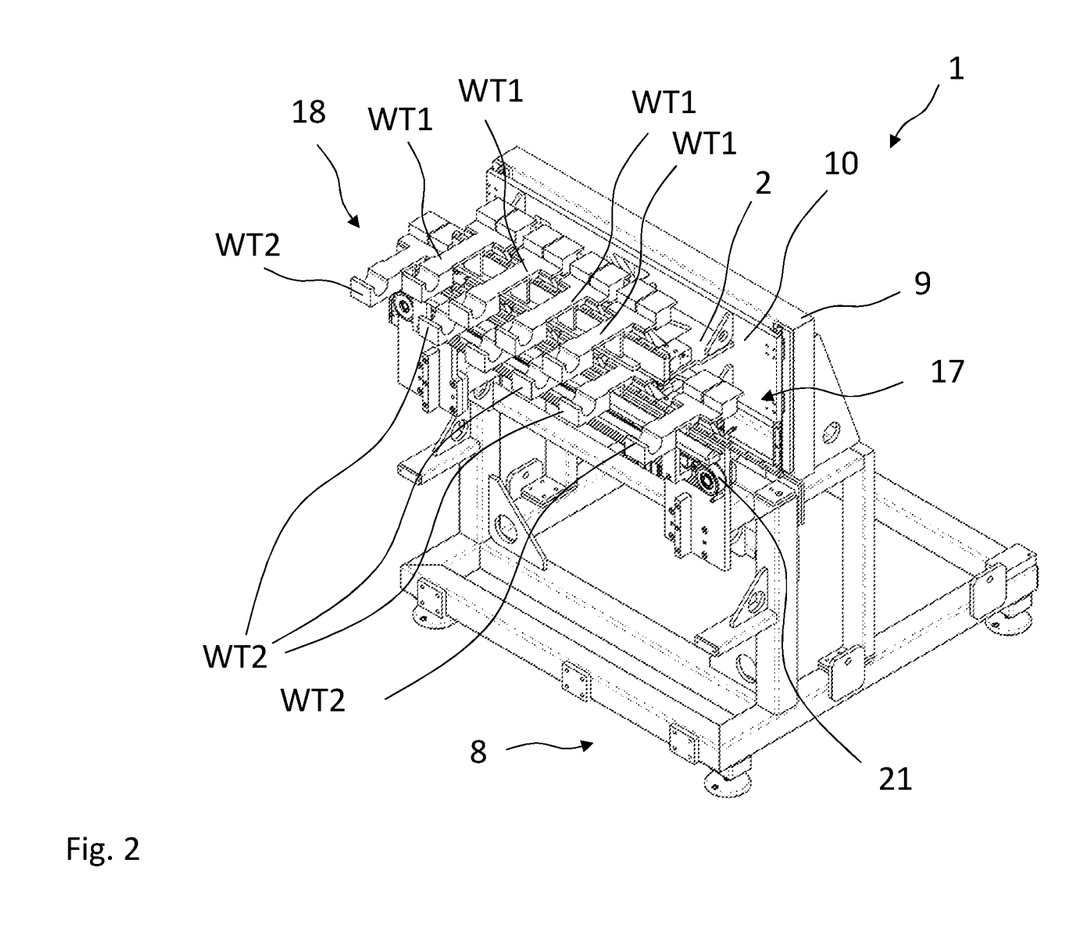
FIG. 2 is a perspective front view of the modular switch device.

FIG. 2 is a perspective front view of the switch device 1. It shows a first carrier unit 2 comprising first workpiece carriers WT1 borne thereon. A second carrier unit on which second workpiece carriers WT2 are arranged is arranged below said first carrier unit, but it is hidden due to the perspective view so is not given a reference sign. The first carrier unit 2 and the second carrier unit are arranged on the shared wall 10 and at a fixed distance from one another such that a rigid structural unit, namely the assembly that is movable in the vertical direction V, is formed as part of the switch device 1 shown in FIG. 1. In this case, as can be seen from FIG. 1, the wall 10 is oriented substantially in the vertical direction V. The carrier units 2, 3, which are oriented substantially horizontally and in parallel with one another, project from a first side of the wall 10 (on the left-hand side in the view of FIG. 1). The lifting device engages on an opposite side of the wall 10 (on the right-hand side in the view of FIG. 1).

In the present case, the second carrier unit is arranged such that it can convey second workpiece carriers WT2 at the conveyance level. In addition, two second workpiece carriers WT2 are arranged on a first fixed part 17 and a second fixed part 18, likewise at the conveyance level.

The first and second fixed parts 17 and 18 are a part of the switch device 1 that is not movable vertically together with the first carrier unit 2 and the second carrier unit. The first and second fixed parts 17 and 18 are arranged upstream and downstream of the first carrier unit 2 and the second carrier unit in the conveyance direction and, while the switch device 1 is in operation, are always arranged such that they can convey workpiece carriers WT1 and WT2, respectively, at the conveyance level. The first and second fixed parts 17 and 18 each comprise a guide apparatus for guiding workpiece carriers WT1 and WT2, in particular moving ones, on the relevant fixed part 17 or 18.

Therefore, a workpiece carrier WT1 or WT2 brought out of a changeover region or processing region toward the switch device 1 first arrives at the switch device 1 on one of the fixed parts 17 or 18, respectively, depending on the direction of origin. A workpiece carrier WT1 or WT2 is then conveyed by the relevant fixed part 17 or 18, respectively, to the carrier unit whose guide apparatus is arranged such that it can convey workpiece carriers WT1 and WT2 at the conveyance level. Depending on the switch device mode, the workpiece carrier WT1 runs from the first fixed part 17 toward the second fixed part 18 or from the second fixed part 18 toward the first fixed part 17.

The first and/or second fixed part 17 or 18 comprise(s) a shared, revolving conveyor belt 21 that can be driven by means of a drive. The drive can, for example, comprise two sheaves, at least one of which is a driven sheave, for instance driven by means of a motor. The conveyor belt 21 interacts with the sheaves such that workpiece carriers can be moved or conveyed by means of the conveyor belt 21.

The conveyor belt 21 extends from the first fixed part 17 to the second fixed part 18 as a revolving belt running over the sheaves. If the first carrier unit 2 or the second carrier unit is arranged at the conveyance level, a workpiece carrier WT1 or WT2 arranged on the relevant guide apparatus 4 or 5, respectively, engages with the conveyor belt 21 and can be conveyed thereby in the conveyance direction.

FIG. 2 shows the switch device 1 in a state in which a number of first workpiece carriers WT1 are temporarily stored on the first carrier unit 2. The second carrier unit is positioned such that it can convey second workpiece carriers WT2, which have been transferred from the first fixed part 17 to the second carrier unit 2, toward a processing region. In addition, the second carrier unit is positioned such that workpiece carriers WT2 transferred from the second fixed part 18 to the second carrier unit can be conveyed toward a changeover region.

Furthermore, FIG. 2 shows the frame 8 and the guide frame 9, by means of which the wall 10 is supported on the guide frame 9.

Figure 3:
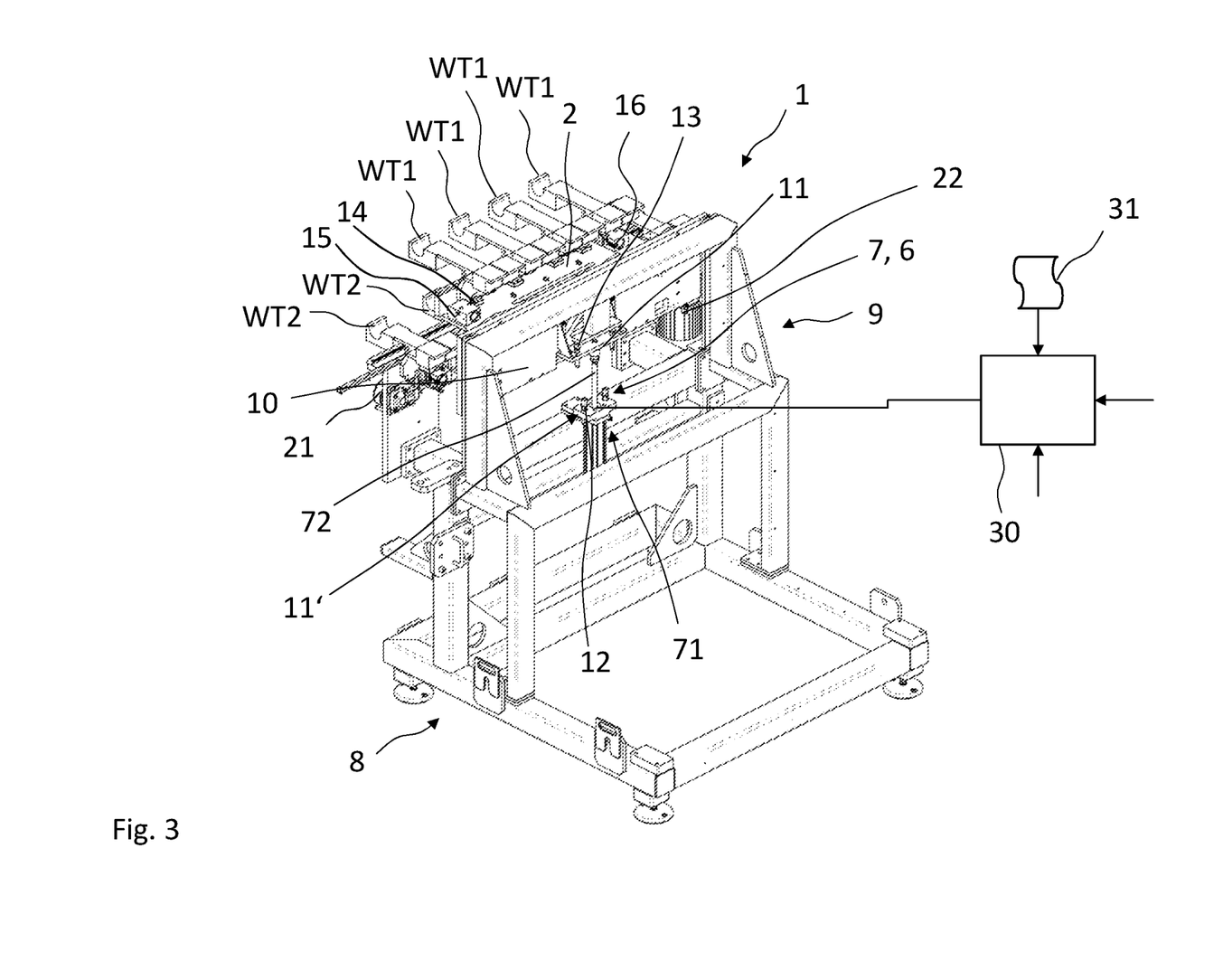
FIG. 3 is a perspective rear view of the modular switch device.

FIG. 3 is a perspective rear view of the switch device 1 shown in front perspective in FIG. 2. FIG. 3 thus shows the switch device 1 in the same state as in FIG. 2. The second carrier unit is still arranged such that it can convey workpiece carriers, in particular second workpiece carriers WT2, at the conveyance level, whereas the first carrier unit is arranged higher in relation to the conveyance level and is temporarily storing first workpiece carriers WT1.

The rear view shows a lifting device 6 in the form of a pneumatic cylinder 7. The pneumatic cylinder 7 comprises a cylinder main body 71 and a piston 72. The cylinder main body 71 is fixedly mounted on the frame 8. The cylinder main body 71 and the frame 8 support the vertical displacement of the wall 10 together with the first and second carrier units borne thereon.

In FIG. 3, the cylinder main body is connected to the frame 8 by means of an overhanging stop plate 11'. The movable piston 72 likewise comprised by the pneumatic cylinder 7 is borne on the cross-plate 11 by its end. As a result of the piston 72 being vertically moved relative to the cylinder main body 71 or the frame 8, the cross-plate 11 can thus be displaced in the vertical direction together with the wall 10.

Two shock absorbers 12 are arranged in the region of the stationary cylinder main body 71. These will be referred to as first shock absorbers 12 since they are used for damping and positioning the movement of the first carrier unit 2, specifically a movement to the effect that workpiece carriers WT1 can be conveyed at a conveyance level by means of the first carrier unit 2.

The conveyance level corresponds to the vertical level at which workpiece carriers can be transferred from the processing region or changeover region to the switch device 1 or transferred from the switch device 1 to the processing region or changeover region.

In addition, the switch device 1 comprises two second shock absorbers 13 arranged on the cross-plate 11. If the pneumatic cylinder 7 moves the cross-plate 11 upward together with the wall 10, the second shock absorbers 13 come into contact with a stop arranged on a guide frame 9. As a result, the lifting movement is gently braked until the second carrier unit is positioned such that it or its guide apparatus can convey workpiece carriers at the conveyance level. The second shock absorbers 13 are thus used to position the second carrier unit such that it can convey workpiece carriers at the conveyance level.

The guide frame 9 supports the wall 10 together with the first carrier unit 2 and second carrier unit borne thereon. In particular, the wall 10 is borne on the guide frame 9 so as to be movable in the vertical direction. For this purpose, the guide frame may have guide rails for enabling a guided vertical movement.

The first carrier unit 2 further comprises a first stopping device, in the form of a stopper cylinder 15, and a second stopping device, in the form of a stopper cylinder 16. These are used for positioning the first workpiece carrier WT1 on the first carrier unit 2. A corresponding first and second stopping device 15 and 16 are also present for the second carrier unit for positioning the second workpiece carrier WT2. However, these stopping devices and the second carrier unit are not visible in FIG. 3 owing to the perspective rear view.

In addition, FIG. 3 shows a schematic illustration of a control unit 30, by means of which the lifting device 6 or pneumatic cylinder 7 can be displaced in a controlled manner. In particular, the conveyor belt 21 and/or its drive 22 can also be controlled using said control unit 30. In addition, the control unit 30 receives a plurality of input variables, for instance from the position sensors 14 and from the stopping devices 15 and 16 on the first carrier unit 2 and on the second carrier unit, respectively. In addition, the control unit can receive data from a production controller and from a controller for the linear conveyor system. On the basis of the acquired data, the carrier units are then lowered or lifted by means of the lifting device 6 actuated by the control unit 30.

For this purpose, the control unit 30 comprises machine-readable program code 31, which, when executed, a corresponding control of the lifting device and, where applicable, the conveyor belt 21 or the drive 22 for the conveyor belt 21 is provided. The program code can be stored in the control unit 30 using a memory or can be loaded or accessed for the control unit 30 from another location, for example via a network.

Figure 4:
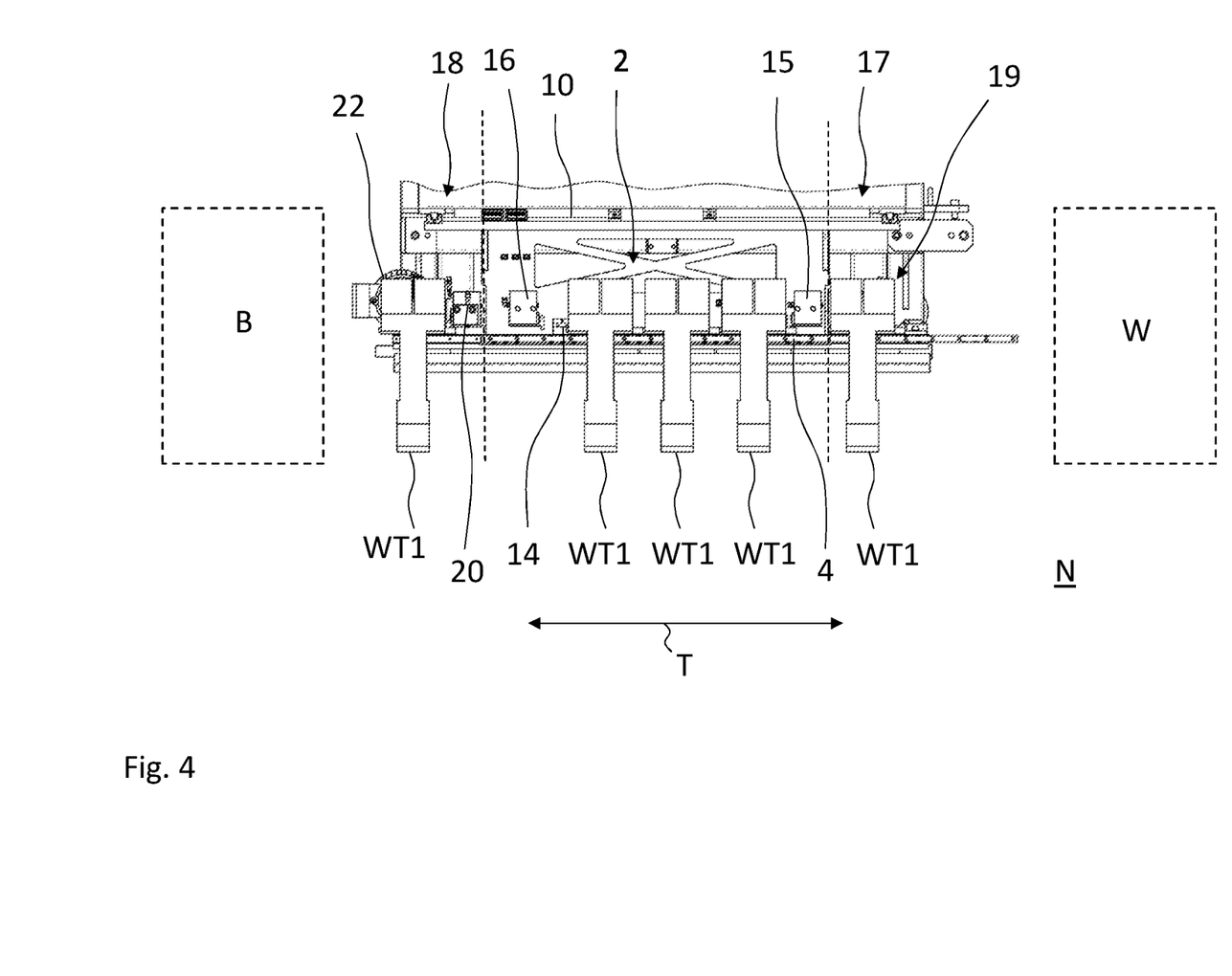
FIG. 4 is a plan view of a carrier unit of the switch device.

FIG. 4 is a schematic plan view of the switch device 1. The first carrier unit 2 can be seen, a plurality of first workpiece carriers WT1 being arranged on the guide apparatus 4 of said carrier unit. Said guide apparatus is arranged at the conveyance level N, i.e., is arranged such that the first carrier unit 2 can carry first workpiece carriers WT1 into the processing region B. It goes without saying that the first carrier unit 2 is thus also arranged such that the first carrier unit 2 can carry first workpiece carriers WT1 into the changeover region W.

FIG. 4 shows that a first fixed part 17 upstream of the first carrier unit 2 in the conveyance direction T is provided, along with a second fixed part 18 downstream of the first carrier unit 2 in the conveyance direction. The first fixed part 17 and the second fixed part 18 are not vertically adjustable by means of the lifting device, i.e., they are stationary during the operation for raising the first and second carrier units relative to the frame.

The first and second fixed parts 17 and 18 are arranged such that they can convey workpiece carriers at a conveyance level N, in particular the conveyance level N of the linear conveyor system. For this purpose, the first fixed part 17 and the second fixed part 18 too comprise a shared conveyor belt.

The first fixed part 17 and the second fixed part 18 each have a stopping device in the form of a stopper cylinder 19 and 20, respectively, for stopping the movement of workpiece carriers WT1 in or counter to a particular conveyance direction T on the relevant fixed part 17 or 18, respectively.

If a workpiece carrier WT1 is brought out of the processing region B and is not intended to be transferred to the first carrier unit 2, it is stopped before being transferred to the first carrier unit 2. Stopping also takes place if, for example, neither the first carrier unit 2 nor the second carrier unit is arranged such as to be able to convey a workpiece carrier WT1 at the conveyance level N. The same applies if a workpiece carrier is brought from the changeover region W to the switch device. Corresponding sensors can be mounted upstream or provided on each fixed part 17 and 18; by means of these sensors, it can be detected whether a workpiece carrier is present at the corresponding position or whether a workpiece carrier has arrived at the fixed part 17 or 18 in question.

Owing to the stopping devices 19 and 20 on the fixed parts 17 and 18, respectively, no workpiece carrier is transferred to the first or second carrier unit if the latter is not intended for this purpose. In addition, workpiece carriers WT1 are prevented from slipping off the moving conveyor belt if the first and second carrier units are not arranged such that they can convey a workpiece carrier WT1 at the conveyance level N.

FIG. 4 also shows two stopping devices, in the form of stopper cylinders 15 and 16, which are arranged on the first carrier unit 2. A first stopper cylinder 16 is arranged in the first quarter or first fifth of the first carrier unit 2 in the conveyance direction T. A second stopper cylinder 15 is arranged in the last quarter or last fifth of the first carrier unit 2 in the conveyance direction. This arrangement is likewise present on the second carrier unit.

Said first and second stopper cylinders 15 and 16 are used to position first workpiece carriers WT1, which have been transferred to the first carrier unit 2, in a desired region of the first carrier unit 2 and to secure them between the first and second stopper cylinders 15 and 16 for the vertical movement. This is equally provided for the second carrier unit in order to position workpiece carriers thereon, in particular second workpiece carriers, as desired.

Figure 5:
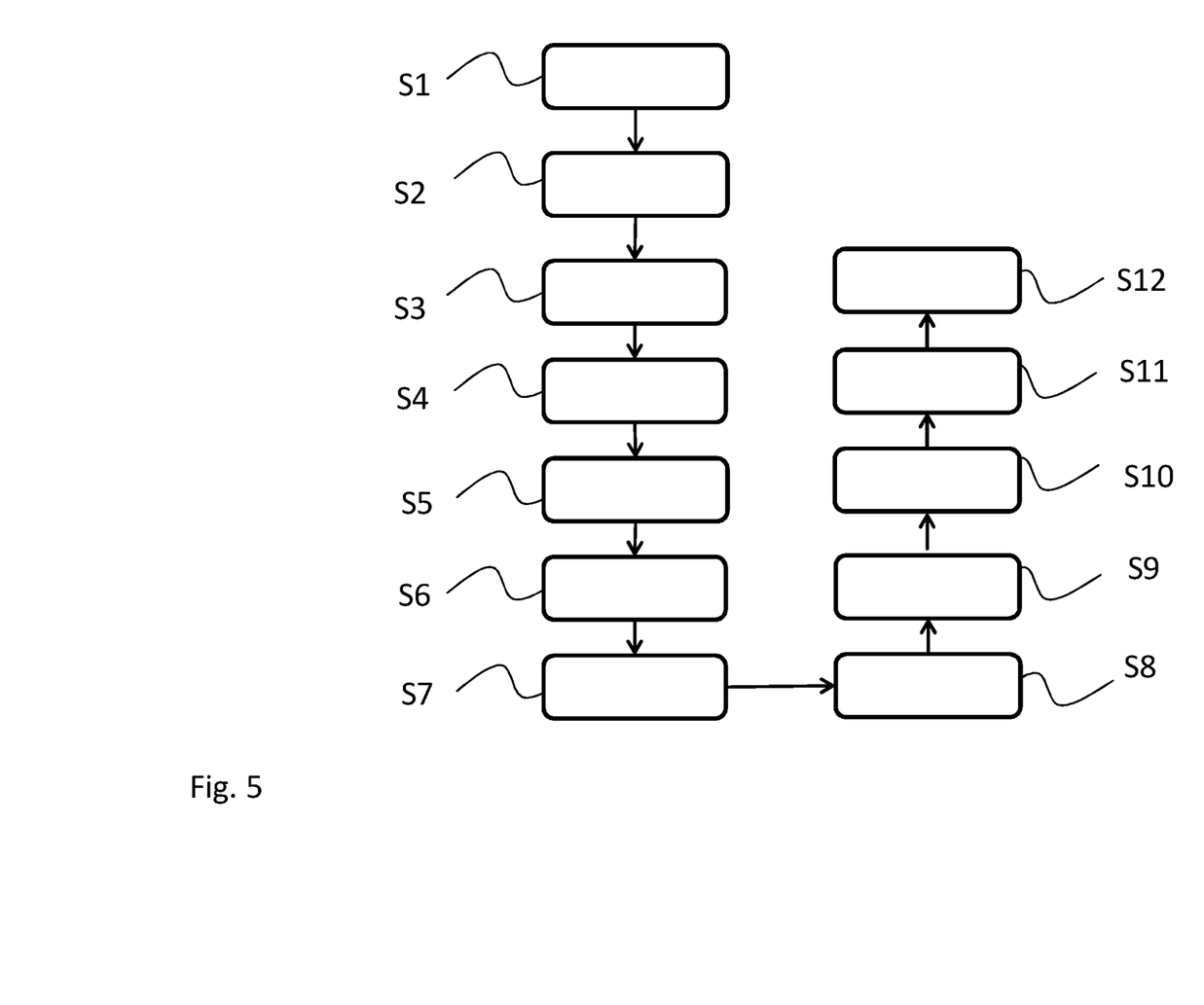
FIG. 5 is a flowchart to illustrate an example method sequence when using structurally identical first and second workpiece carriers.

FIG. 5 is a flowchart for a schematic sequence of an example method for operating the modular switch device described in FIG. 1 to 3, the first and second workpiece carriers used being structurally identical. The switch device is arranged between a processing region and a changeover region, the changeover region being formed as a depositing and removal region.

The method starts with second workpiece carriers already being processed in the processing region, so the changeover region is empty and first workpieces can be positioned on first workpiece carriers therein.

First, workpieces on first workpiece carriers in the changeover region are positioned or deposited on the conveyor belt.

In a method step S1, the loaded first workpiece carriers are conveyed from the changeover region to the switch device. They are conveyed at the conveyance level of the linear conveyor system.

In a method step S2, the control unit checks whether the first carrier unit, i.e., the upper carrier unit, is arranged for receiving first workpiece carriers, i.e., is arranged such that first workpiece carriers can be transferred thereto at the conveyance level.

In a subsequent method step S3, a predetermined number of first workpiece carriers are conveyed to the first carrier unit. This predetermined number of first workpiece carriers is stored or can be ascertained in the control apparatus.

In a method step S4, the first one of the first workpiece carriers in the conveyance direction is stopped by means of the first stopping device in the conveyance direction. For this purpose, the stopper cylinder is activated and the first one of the first workpiece carriers in the conveyance direction bumps into the stopper cylinder; the movement of the first workpiece carrier in the conveyance direction is blocked, or the first workpiece carrier is not conveyed any further.

In a subsequent method step S5, the further first workpiece carriers of the predetermined number of workpiece carriers are arranged in a butting manner on the first stopped workpiece carrier. In the process, the stopped workpiece carrier upstream in the conveyance direction acts as the stopping device for subsequent workpiece carriers since subsequent workpiece carriers bump into it and are stopped. The predetermined number of workpiece carriers is determined in such a way that they can be arranged in an intended region of the first carrier unit, in particular in a butting manner.

In a method step S6, the control unit uses position sensors to check the positions of the first workpiece carriers on the first carrier unit. The control unit assesses whether the workpiece carriers are arranged in the intended region, in particular between a first stopper cylinder in the first quarter of the carrier unit in the conveyance direction and a second stopper cylinder in the last quarter of the first carrier unit in the conveyance direction. If this is not the case, the first workpiece carriers are repositioned until they are arranged in the intended region.

Once they are positioned in the intended region of the first carrier unit, the control unit actuates the lifting device in a method step S7 and raises the first carrier unit together with the first workpiece carriers borne thereon and the second carrier unit. They are raised by positioning the second carrier unit such that workpiece carriers borne thereon can be conveyed at a conveyance level.

In a method step S8, second workpiece carriers are then temporarily conveyed out of the processing region and to the changeover region via the switch device. During this process, the first workpiece carriers are temporarily stored in the upper plane. The first workpiece carriers are temporarily stored at the upper plane until they are cleared. This clearance can be communicated to the control unit by a production control unit in order to control the lifting device.

In a method step S9, the control unit checks whether the temporarily stored workpiece carriers have been cleared to be moved. This occurs when all the second workpiece carriers have been conveyed from the processing region to the changeover region, which is acting as the removal region for the second workpiece carriers, by being conveyed via the second carrier unit.

If this is the case, in a method step S10 the control unit lowers the first carrier unit such that the first workpiece carriers borne thereon can be conveyed at the conveyance level.

In a method step S11, the first workpiece carriers are conveyed by the first carrier unit into the processing region, where they are processed. Here, a corresponding manufacturing product is produced from the workpieces received, for example, on the first workpiece carriers.

In method step S12, the workpieces are removed from the second workpiece carriers, which are loaded with new workpieces, for example raw cables.

A new cycle can then begin, in which first or second workpiece carriers are provided for temporary storage on the switch device, in particular when loaded with workpieces, and are conveyed thereto. It goes without saying that the cycle can likewise be run through using temporarily stored second workpiece carriers instead of first workpiece carriers.

By means of a method of this kind, a changeover region that can be used simultaneously as a depositing region and a removal region can be operated efficiently by just one operator without adversely impacting on the productivity of the linear conveyor system.

Figure 6:
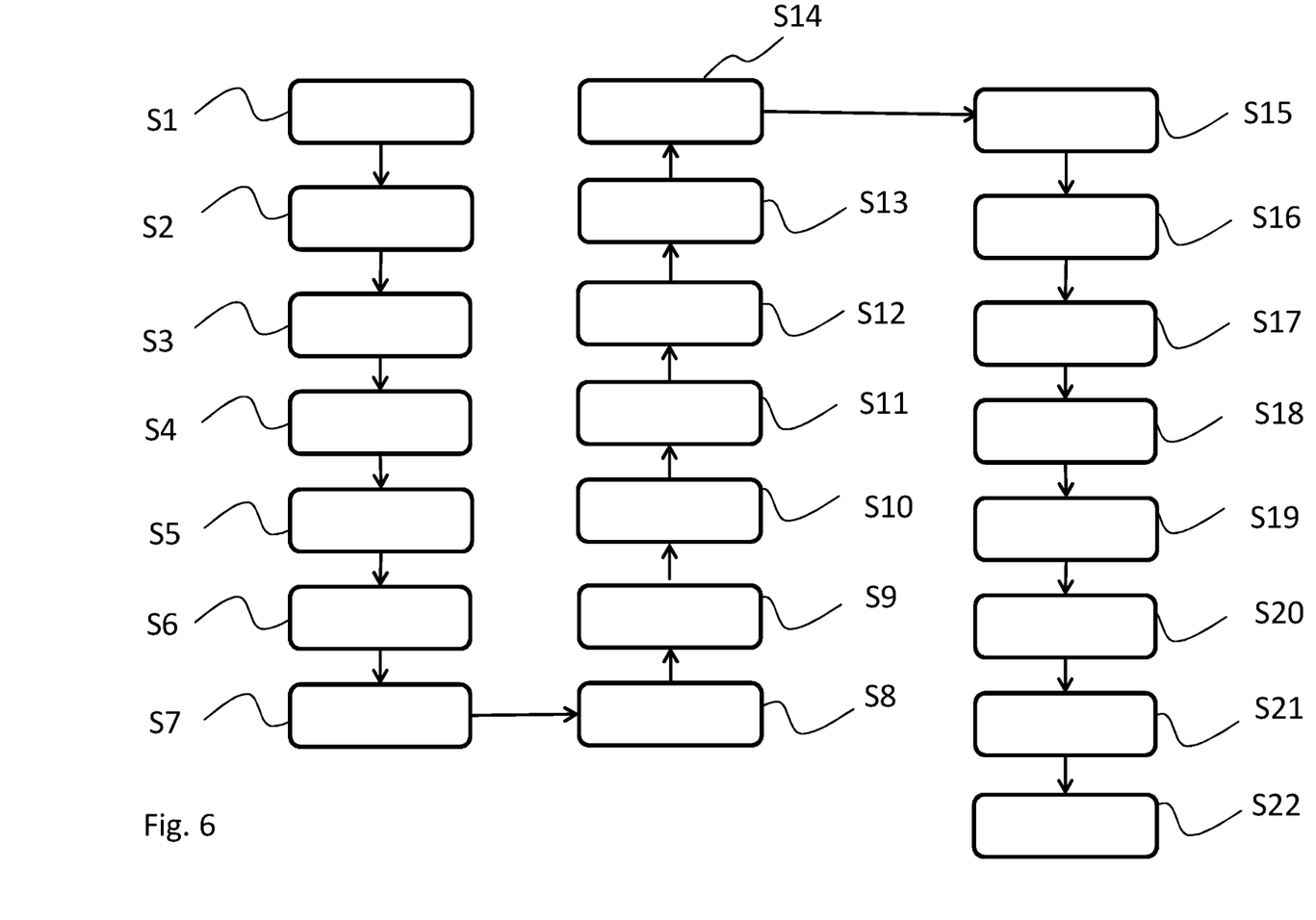
FIG. 6 is a flowchart to illustrate an example method sequence when using structurally different first and second workpiece carriers.

FIG. 6 shows a variant of the method for first and second workpiece carriers of different types; for example, the first workpiece carrier may have a long arm and the second workpiece carrier may have a short arm. Different workpiece carriers of this kind are particularly advantageous when manufacturing lines. In the method according to FIG. 6, the above-mentioned method steps S1 to S12 according to FIG. 5 are run through accordingly.

When processing first and second workpiece carriers that are structurally different, workpiece carriers of different types have to be prevented from being arranged in the changeover region at the same time, or the workpiece carriers of different types have to be prevented from meeting one another on the linear conveyor system. To still operate a linear conveyor system efficiently, it is advantageous to further develop the method described according to FIG. 5.

Whereas in method step S12 the workpieces are removed from the second workpiece carriers, which are loaded with new workpieces, for example raw cables, in method step S13 the first workpiece carriers processed in the processing region are conveyed back toward the changeover region.

However, since second workpiece carriers are positioned in the changeover region, the first workpiece carriers brought out of the processing region cannot be conveyed into the changeover region.

For this reason, the first workpiece carriers are channeled again by means of the switch device in order to allow the newly loaded second workpiece carriers arranged in the changeover region to pass by without the first and second workpiece carriers meeting.

In a method step S14, the predetermined number of first workpiece carriers arriving from the processing region are arranged on the first carrier unit of the switch device. For this purpose, it is checked beforehand whether the first carrier unit is arranged such that first workpiece carriers arriving from the processing region can be arranged on the guide apparatus of said carrier unit. If this is not the case, the lifting device is actuated accordingly and the first carrier unit is positioned accordingly. However, if the method is carried out according to the aforementioned method steps S1 to S12, the first carrier unit is in a position that is suitable for receiving first workpiece carriers. The first workpiece carriers brought out of the processing region run onto the guide apparatus of the first carrier unit via the fixed part facing the processing region.

In a method step S15, the first one of the first workpiece carriers in the direction of the changeover region is stopped by means of the stopping device, which faces the changeover region, on the guide apparatus of the first carrier unit.

Next, in a method step S16, the predetermined number of first workpiece carriers are arranged in a butting manner on the first carrier unit, and the positions of the first workpiece carriers thereon are checked in a method step S17.

If the first workpiece carriers are arranged such that the first carrier unit can be moved vertically, the first and second carrier units are raised in a method step S18 until the second carrier unit is arranged such that workpiece carriers can be conveyed at the conveyance level by means of the guide apparatus thereof.

If the second carrier unit is arranged accordingly, the second workpiece carriers are carried from the changeover region to the processing region via the switch device. This is done in a method step S19.

In a subsequent method step S20, the control unit checks whether the first workpiece carriers borne on the first carrier unit can be cleared to be conveyed onward into the changeover region, in particular whether all the second workpiece carriers from the changeover region have already left the switch device in the direction of the processing region.

If this is the case, in a method step S21 the first carrier unit can be lowered such that the first workpiece carriers are arranged at the conveyance level. The first workpiece carriers can then be conveyed from the switch device to the changeover region.

In a method step S22, the workpieces, for example finished lines, processed in the processing region and borne on the first workpiece carriers are removed in the changeover region. Afterwards, the first workpiece carriers arranged in the changeover region can be reloaded with new workpieces, for example raw cables. The method can then be run through from the start with step S1.

By means of the method according to FIG. 6, it is possible to operate a linear conveyor system using two structurally different workpiece carriers; these workpiece carriers are always channeled past one another so as to avoid manufacturing issues. In addition, here too workpieces can be removed and deposited by means of just one changeover region and using just one person.

Since the device and method described in detail above are embodiment examples, a person skilled in the art can extensively modify them in the conventional way without departing from the scope of the invention. In particular, the mechanical arrangements and relative proportions of the individual elements are merely examples.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Switch device
2 Carrier unit, first
3 Carrier unit, second
4 Guide apparatus, borne on the first carrier unit
5 Guide apparatus, borne on the second carrier unit
6 Lifting device
7 Cylinder
71 Cylinder main body
72 Piston
8 Frame
9 Guide frame
10 Wall
11 Cross-plate
11' Stop plate
12 Shock absorber, first
13 Shock absorber, second
14 Position sensor
15 Stopping device, stopper cylinder, first
16 Stopping device, stopper cylinder, second
17 Fixed part, first, upstream of the carrier units in the conveyance direction
18 Fixed part, second, downstream of the carrier units in the conveyance direction
19 Stopping device, first fixed part: stopper cylinder
20 Stopping device, second fixed part: stopper cylinder
21 Conveyor belt, arranged for conveying at the conveyance level
22 Drive for conveyor belt
30 Control unit
31 Machine-readable program code
W Changeover region
B Processing region
WT1 Workpiece carrier, first
WT2 Workpiece carrier, second
F Base of a workpiece carrier
T Conveyance direction
N Conveyance level
V Vertical direction
S1 Moving loaded first workpiece carriers from the changeover region to the switch device
S2 Step of checking whether the first carrier unit is arranged for receiving first workpiece carriers S3 Conveying the predetermined number of first workpiece carriers to the first carrier unit S4 Stopping the workpiece carrier that is first in the conveyance direction S5 Arranging the first workpiece carriers in a butting manner S6 Checking the positions of the first workpiece carriers on the first carrier unit S7 Raising the first carrier unit, together with the first workpiece carriers, until the second carrier unit is arranged for receiving second workpiece carriers S8 Conveying second workpiece carriers from the processing region to the changeover region S9 Checking whether the first workpiece carriers have been given clearance S10 Lowering the first carrier unit to convey workpiece carriers away to the processing region S11 Conveying the first workpiece carriers away toward the processing region S12 Removing and loading the workpieces, borne on the second workpiece carriers, in the changeover region S13 Conveying first workpiece carriers from the processing region to the switch device S14 Conveying the predetermined number of first workpiece carriers to the first carrier unit S15 Stopping the workpiece carrier that is first in the conveyance direction S16 Arranging the first workpiece carriers in a butting manner S17 Checking the positions of the first workpiece carriers on the first carrier unit S18 Raising the first carrier unit, together with the first workpiece carriers, until the second carrier unit is arranged for receiving second workpiece carriers S19 Conveying second workpiece carriers from the changeover region to the processing region S20 Checking whether the first workpiece carriers have been given clearance S21 Lowering the first carrier unit to convey workpiece carriers away into the changeover region S22 Removing and then loading the workpieces, borne on the first workpiece carriers, in the changeover region

What is claimed is:

1. A modular switch device for temporarily storing workpiece carriers for a linear conveyor system, wherein the modular switch device is arrangeable between a changeover region, comprising a depositing and/or removal region, and a processing region of the linear conveyor system that conveys workpiece carriers at a conveyance level, the modular switch device comprising:
a first and a second carrier unit, wherein the first and the second carrier unit are each horizontally arranged and are disposed vertically one above the other at a fixed distance from one another, each of the first and the second carrier unit having a respective guide apparatus, by which respective ones of the workpiece carriers are conveyable in a conveyance direction in interaction with a conveyor belt, wherein the first and the second carrier unit are movable together in a vertical direction by a lifting device in such a way that both the guide apparatus arranged on the first carrier unit and the guide apparatus arranged on the second carrier unit are positionable such that the respective workpiece carriers are conveyable at the conveyance level by the respective guide apparatuses.

2. The modular switch device according to claim 1, wherein the first and the second carrier unit are disposed on a shared wall that is movable in the vertical direction by the lifting device.

3. The modular switch device according to claim 2, wherein the lifting device is configured as a pneumatic cylinder having a cylinder main body, which is stationary relative to a frame and is disposed on the frame, and a piston that is movable in the vertical direction in a controlled manner, wherein an end of the piston is disposed on a cross-plate arranged on the wall.

4. The modular switch device according to claim 2, wherein the vertical movement of the wall is limited by a first and a second shock absorber, wherein the first shock absorber is arranged in such a way as to limit the vertical movement when the guide apparatus disposed on the first carrier unit is positioned such that the respective workpiece carrier arrangeable thereon is conveyable at the conveyance level, and wherein the second shock absorber is arranged in such a way as to limit the vertical movement when the guide apparatus disposed on the second carrier unit is positioned such that the respective workpiece carrier arrangeable thereon is conveyable at the conveyance level.

5. The modular switch device according to claim 1, wherein a plurality of sensors configured to detect positions of the workpiece carriers are arranged on the first and second the carrier unit.

6. The modular switch device according to claim 1, wherein at least one stopping device comprising a stopper cylinder is arranged on the first carrier unit and/or the second carrier unit, and wherein the movement of the respective workpiece carriers on the respective guide apparatus is stoppable at a predetermined position by the stopping device.

7. The modular switch device according to claim 6, wherein at least one first and one second stopping device are respectively arranged on the first carrier unit and/or the second carrier unit, and wherein the positions of the respective workpiece carriers are limited, by the respective stopping devices, to a position between the first stopping device and the second stopping device on the respective guide apparatus.

8. The modular switch device according to claim 1, further comprising a first fixed part, which is upstream of the first and second carrier units in the conveyance direction and is stationary relative to the conveyance level, and a second fixed part, which is downstream of the first and second carrier units in the conveyance direction and is stationary relative to the conveyance level, wherein the first and/or the second fixed part comprise(s) the conveyor belt, and wherein the respective workpiece carriers arranged on the respective carrier units are conveyable by the conveyor belt when the workpiece carriers are arranged at the conveyance level.

9. The modular switch device according to claim 8, wherein the first and the second fixed part each comprise at least one stopping device configured to stop the respective workpiece carriers, which have been brought out of the processing region and/or out of the changeover region, at a predetermined position on the first or second fixed part before the respective workpiece carriers are transferred to the respective guide apparatus.

10. A method for operating the modular switch device according to claim 1, the method comprising:
conveying predetermined number of first workpiece carriers out of the changeover region of the linear conveyor system toward the first carrier unit, arranging the predetermined number of first workpiece carriers on the first carrier unit within a region provided for the first workpiece carriers, and moving the first and the second carrier unit vertically once the predetermined number of first workpiece carriers have been arranged on the first carrier unit, thereby arranging the second carrier unit such that second workpiece carriers are conveyable in a guided manner at the conveyance level by the guide apparatus disposed on the second carrier unit.

11. The method according to claim 10, wherein the second workpiece carriers brought from the changeover region to the switch device are conveyed in a guided manner to the processing region by the guide apparatus arranged on the second carrier unit, and/or wherein the second workpiece carriers brought from the processing region to the switch device are conveyed in a guided manner to the changeover region by the guide apparatus disposed on the second carrier unit.

12. The method according to claim 10, further comprising checking whether the first workpiece carriers disposed on the first carrier unit have been cleared to be conveyed into the processing region or to be conveyed into the changeover region, and wherein, in a case that a clearance has been given, the first carrier unit is lowered such that the first workpiece carriers disposed on the first carrier unit are conveyable at the conveyance level and, once the first workpiece carriers reach the conveyance level, the first workpiece carriers are conveyed to the processing region or to the changeover region depending on the clearance given.

13. The method according to claim 10, wherein, while the first workpiece carriers are being conveyed to the processing region, or while the first workpiece carriers are being processed in the processing region, at least one of the second workpiece carriers, or a workpiece borne on one of the second workpiece carriers, is removed in the changeover region.

14. A control unit for controlling a switch device, wherein the control unit comprises a processor and machine-readable program code comprising control commands which, when executed, cause the control unit to carry out the method according to claim 10.

15. The control unit according to claim 14, wherein the control unit is configured to predetermine the number of first workpiece carriers.

16. A tangible, non-transitory computer-readable medium having control commands, which upon being executed by one or more processors of a control unit, cause the control unit to carry out the method according to claim 10.

* * * * *